(12) United States Patent
Wilson

(10) Patent No.: US 7,684,562 B1
(45) Date of Patent: Mar. 23, 2010

(54) TELEPHONE SANITIZING GLOVE

(76) Inventor: Loura R. Wilson, 509 E. Cornell Dr., Rialto, CA (US) 92376

( * ) Notice: Subject to any disclaimer, the term of this patent is extended or adjusted under 35 U.S.C. 154(b) by 420 days.

(21) Appl. No.: 11/775,944

(22) Filed: Jul. 11, 2007

(51) Int. Cl.
*H04M 1/00* (2006.01)
*H04M 9/00* (2006.01)
(52) U.S. Cl. ........................ 379/452; 379/439
(58) Field of Classification Search ............ 294/25; 2/160, 69; 15/227; 379/437, 447, 439, 451, 379/452
See application file for complete search history.

(56) References Cited

U.S. PATENT DOCUMENTS 4,953,567 A * 9/1990 Ward .................. 128/851
6,079,049 A * 6/2000 Moir .................. 2/69

* cited by examiner

*Primary Examiner*—Tuan D Nguyen

(57) ABSTRACT

A telephone sanitizing glove that is formed by a glove body of a sound permeable cloth material impregnated with a disinfectant or a sanitizing solution which includes two covers each having a circular cup shape for covering the mouthpiece and the earpiece of a telephone.

5 Claims, 3 Drawing Sheets

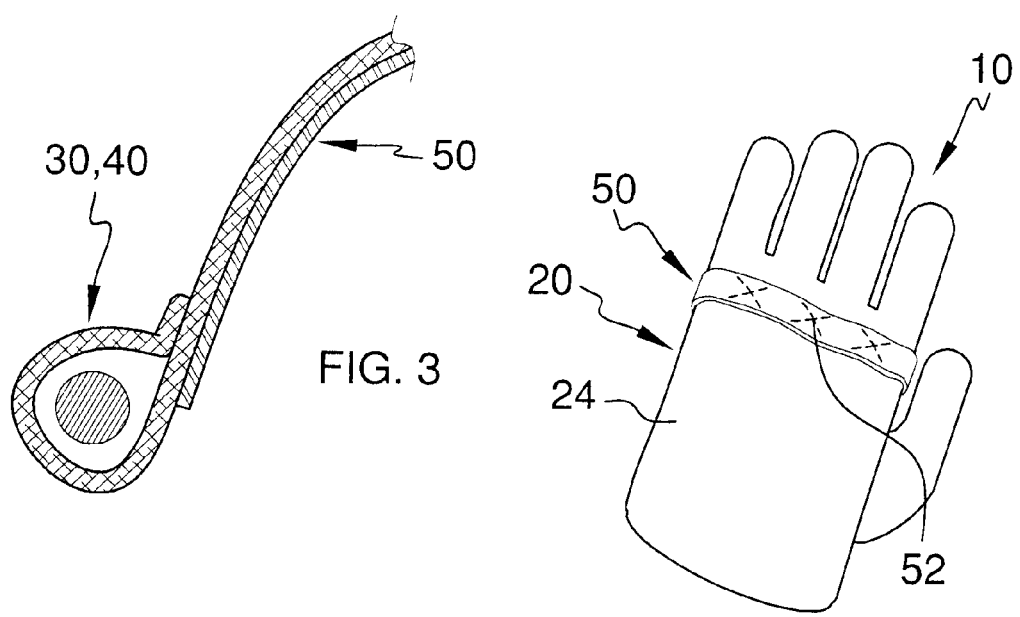
FIG. 3
FIG. 4
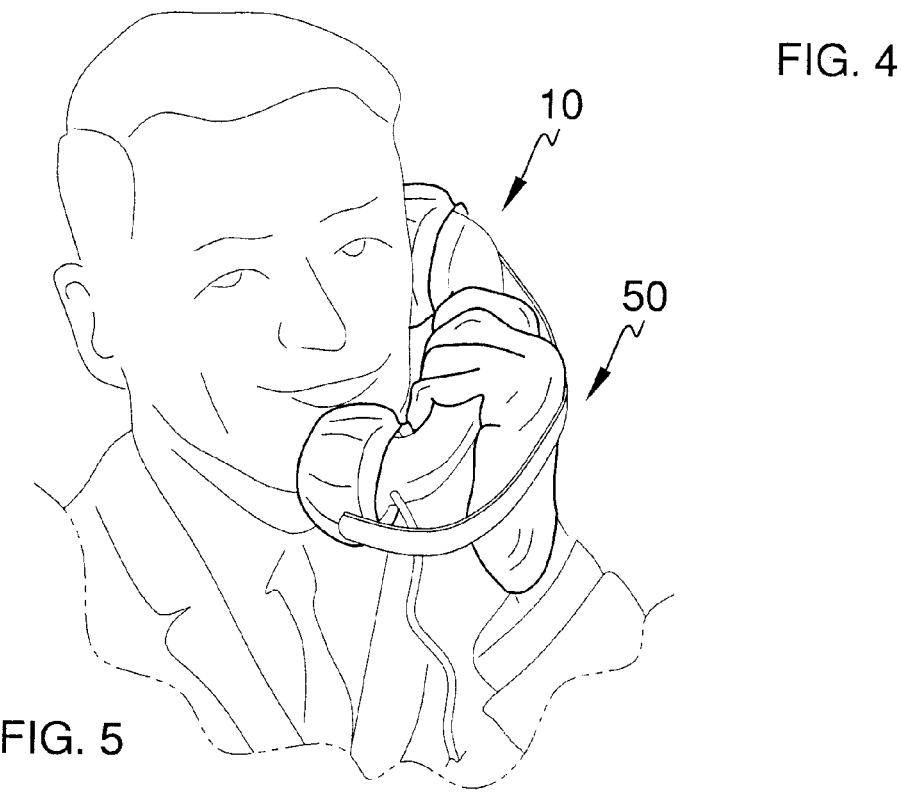
FIG. 5

TELEPHONE SANITIZING GLOVE

FIELD OF THE INVENTION

The present invention generally relates to a telephone accessory and more particularly, relates to a sanitizing glove for use on a public or private telephone that would prevent contact with germs, bacteria, sweat, and odors left by other individuals.

BACKGROUND OF THE INVENTION

The use of telephones in a person's daily life including public pay phones or commonly shared private telephones is inevitable. When using a public pay phone, or a private telephone that is used by a group of people, a person would be exposed to germs, bacteria, sweat, and odors left by other individuals who have previously used the same phone. It can be an unpleasant experience in using such phones if a person is not prepared with a cleaning apparatus for first cleaning the phone before usage. It is therefore desirable to provide an apparatus, or a device that can be used to avoid a direct contact with a public phone or commonly used phone when making a telephone call.

It is therefore an object of the present invention to provide an apparatus that can be used on telephones that may be contaminated by other users.

It is another object of the present invention to provide a sanitizing glove for use on a public pay phone or a commonly used telephone such that direct contact with the telephone by the user's hand can be avoided.

SUMMARY OF THE INVENTION

In accordance with the present invention, a telephone sanitizing glove is provided.

In a preferred embodiment, the present invention telephone sanitizing glove is constructed of a glove body that has a palm portion and a back portion connecting together a thumb portion and four finger portions; two covers each having generally a circular cup shape connected by a strap therein between wherein a center portion of the strap is attached to one of the palm portion and back portion; and a pouch formed on the palm portion or the back portion to store the two covers before usage.

BRIEF DESCRIPTION OF THE DRAWINGS

The invention will now be described, by way of example, with reference to the accompanying drawings, in which:

FIG. 3 is an enlarged, cross-sectional view of the cover for the present invention telephone sanitizing glove.

FIG. 4 is a back view of the back portion of the glove shown in FIG. 2.

FIG. 5 is a perspective view illustrating how the present invention telephone sanitizing glove is used.

DETAILED DESCRIPTION OF THE PREFERRED EMBODIMENT

The present invention discloses a telephone sanitizing glove which can be used on a public or private telephone that prevents contact with germs, bacteria, sweat, and odors left by other users of the telephone.

The present invention telephone sanitizing glove is a sanitizing glove that can be used on public phones, business phones, office phones, home phones, etc. It consists of a sound permeable that is available for the right hand or for the left hand. Covers for the mouthpiece and earpiece on the telephones receiver can be sewn onto the glove. The ear and mouth piece covers can be impregnated with a disinfectant or sanitizing solution. The present invention telephone sanitizing glove can be snapped or secured across the foam instrument to allow the user to insert coins and phone cards and dial the number on the key board without actually touching the buttons. In using the present invention sanitizing glove, an individual would simply place his or her hand inside the glove. The covered hand would then pick-up the receiver of the foam instrument. Coins or a phone card can be placed into the covered hand and placed into the foam. The user can also dial the numbers with the covered hand, as well as hang up the phone and remove any remaining change. The glove can be removed and simply thrown away after usage.

The present invention telephone sanitizing glove greatly eliminates the potential spreading of communicable diseases. It would reduce the chance of transferring germs and bacteria on telephone among users, thus achieving improved health benefits through usage. It can also help reduce the chance of spreading communicable diseases via the telephone, particularly public pay phones or those used by a lot of people. The round and square sanitizing glove can be produced from a sterile cloth material and in a wide variety of assorted colors and shapes.

The present invention telephone sanitizing glove fulfills the need for providing improved sanitation and more healthful conditions when using public or private telephones. The appealing features of the sanitizing glove are its safety, sanitation, convenience, comfortable design, practicality, effectiveness, lightweight, portability, disposable design, and ease of use. The sanitizing glove would aid in preventing the transfer of germs, bacteria, make-up, blood, saliva, wax, sweat, perspiration, odors, etc. between users of public or communal telephones. As a result, it reduces the chance for people getting colds, ear infections, sore throats, and viral infections that can cause upper repository diseases. The individual who utilizes the present invention sanitizing glove would avoid contact with the entire telephone instrument.

Figure 1:
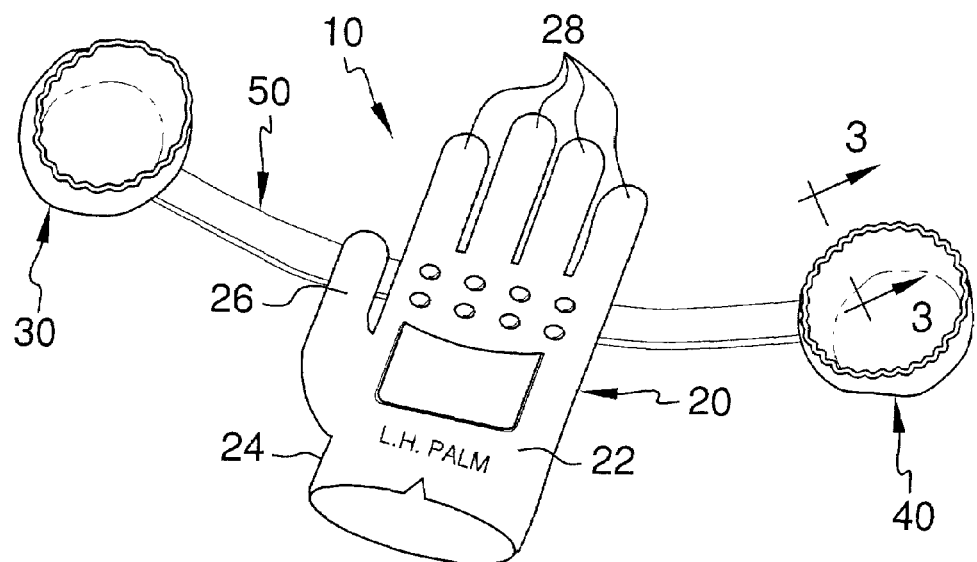
FIG. 1 is a perspective view of one embodiment of the present invention telephone sanitizing glove.

Referring initially to FIG. 1, wherein a perspective view of the present invention telephone sanitizing glove 10 is shown. The telephone sanitizing glove 10 is constructed of a glove body 20 that has a palm portion 22, a back portion 24 connecting together a thumb portion 26 and four finger portions 28. Two covers 30, 40 each having generally a circular cup shape connected by a strap 50 therein between wherein a center portion 52 (shown in FIG. 4) of the strap 50 is attached to one of the palm portion 22 and the back portion 24. For instance, the strap 50 is attached to the back portion 24 in FIG. 1, while the strap 50 is attached to the palm portion 22 in FIG. 6.

Figure 2:
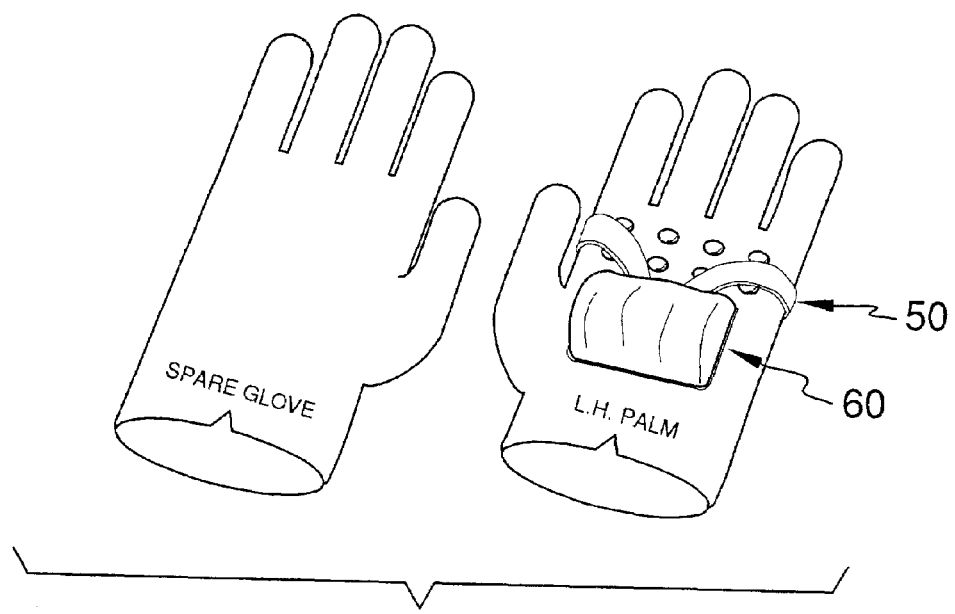
FIG. 2 is a perspective view of the present invention telephone sanitizing glove of FIG. 1 with the protective covers stored in the pouch.
Figure 6:
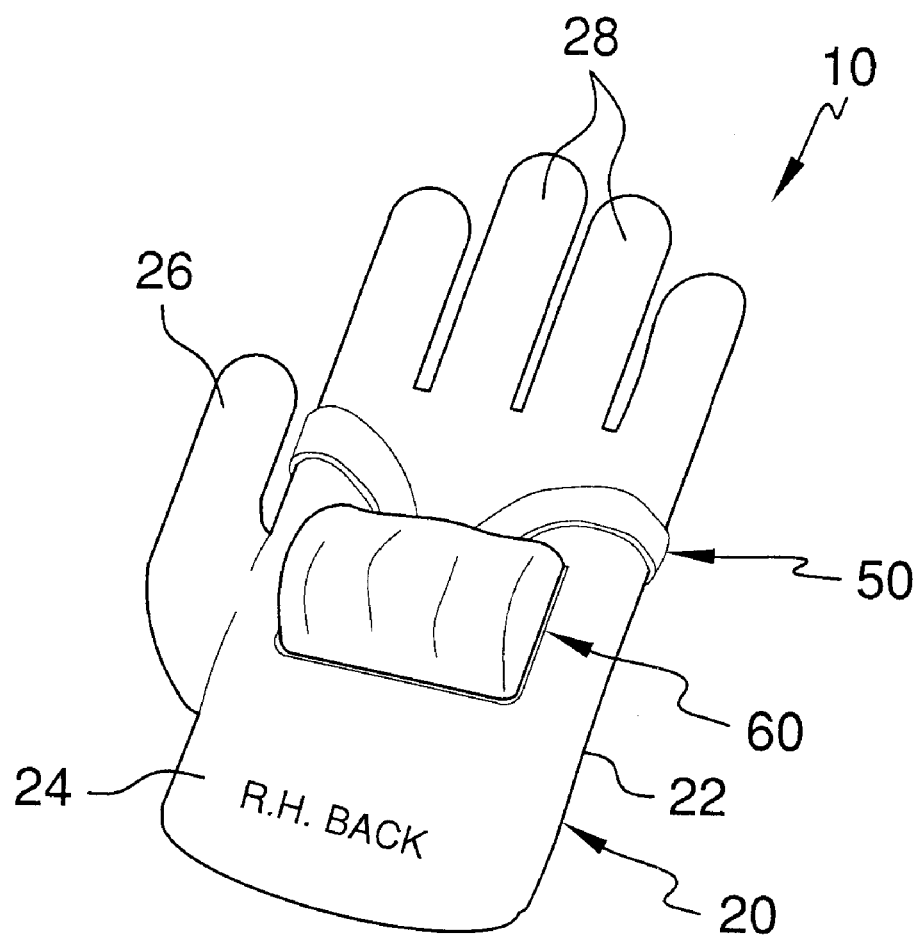
FIG. 6 is a perspective view of another embodiment of the present invention telephone sanitizing glove with the pouch formed on the back portion of the glove.

A pouch 60 is formed either on the palm portion 22 or on the back portion 24 for storing the two covers 30, 40 before usage. For instance, FIG. 2 illustrates an embodiment wherein the pouch is formed on the palm portion 22, while in another embodiment as shown in FIG. 6, the pouch 60 is formed on the back portion 24.

FIG. 3 is a partial, enlarged, cross-sectional view of the present invention strap 50 and the cup 30 or 40. FIG. 4 illustrates how the strap 50 is attached at the center portion 52 to a back portion 24 of the sanitizing glove 10. In another embodiment shown in FIG. 6, the pouch 60 is formed on the back portion 24 of the glove 10.

The glove body 20 can be formed of a sound permeable cloth material that can be fabricated in low cost and thus laid readily disposable. The sound permeable cloth can be impregnated with a disinfectant solution or a bacteria sanitizing solution in order to kill germs upon contact.

The present invention telephone sanitizing glove has therefore been amply described in the above descriptions and in the appended drawings of FIGS. 1-6.

While the preferred embodiments of the invention have been described above, it will be recognized and understood that various modifications can be made in the invention and the appended claims are intended to cover all such modifications which may fall within the spirit and scope of the invention.

What is claimed is:

1. A telephone sanitizing glove comprising:
   a glove body having a palm portion and a back portion connecting together a thumb portion and four finger portions;
   two covers adapted for covering a mouth piece and an earpiece of a telephone handset each having generally a circular cup shape connected by a strap thereinbetween wherein a center portion of the strap is attached to one of said palm portion and back portion; and
   a pouch formed on said palm portion or said back portion for storing said two covers before usage.

2. The telephone sanitizing glove according to claim 1, wherein said glove body is formed of a sound-permeating cloth.

3. The telephone sanitizing glove according to claim 1, wherein said glove body is formed of a sound-permeating cloth material impregnated with a disinfectant solution.

4. The telephone sanitizing glove according to claim 1, wherein said glove body is formed of a thin cloth material impregnated with a sanitizing solution effective in killing germs and bacteria.

5. The telephone sanitizing glove according to claim 1, wherein said two covers in a circular cup shape each having an elastic edging on the cup for improved retention on the mouthpiece or earpiece of the telephone handset.

* * * * *